May 11, 1965

R. S. SLAWSON 3,183,425

SCR SUPPLY FOR REVERSIBLE MOTOR SYSTEM

Filed Jan. 30, 1963

INVENTOR.
RICHARD S. SLAWSON
BY
*Barlow & Barlow*
ATTORNEYS

# United States Patent Office 3,183,425
Patented May 11, 1965

3,183,425
SCR SUPPLY FOR REVERSIBLE MOTOR SYSTEM
Richard S. Slawson, Barrington, R.I., assignor to George W. Dahl Company, Inc., a corporation of Rhode Island
Filed Jan. 30, 1963, Ser. No. 254,962
4 Claims. (Cl. 318—227)

This invention relates to controls for alternating current loads including motors, and particularly a control system for reversible motors or those motors having reversing windings.

It is often desired to control an alternating current load in a fashion which will instantly respond to an external signal. If the load is an alternating current motor, the control means in the past have principally involved the use of saturable reactors and because of the expense and the size involved have not been too practical. Particularly in motor control, it has been necessary to utilize an alternating current signal as the control source, and in many applications this presents a problem since the available control signal may very well be a D.C. signal which must in some way be converted to an alternating current signal to control the motor.

It is, therefore, the principal object of this invention to operate an alternating current load directly by utilizing a direct current signal source.

Another object of the invention is to utilize a bridge rectifier circuit in a fashion which will control the flow of alternating current to a pair of loads.

A still further object of the invention is to provide a source of voltage for a control amplifier directly from the switched loads.

The novel control system which is described in detail below basically consists of utilizing two loads to be energized from an A.C. source. Connected in series with each of the loads is a bridge rectifier. Across the output legs of the bridge rectifier is a switch. The switch can take a variety of forms, that is, it can consist of a transistor or a PNPN silicon controlled switch or, alternately, a gas thyratron. The switch effectively controls the flow of current through the bridge circuit. When the circuit is closed across the output legs of the bridge rectifier, it will be obvious that the current will flow alternately through each pair of legs of the bridge on each reversal of the alternating current source. It will further be apparent that if the circuit is opened, no current flow will take place. Accordingly, a switching action will be secured for each load by merely opening or closing the switch connected across the output legs of the bridge rectifier. Making such a device practical calls for the replacement of the switch by a fast acting device, and this device is preferably a solid state device which has applied thereto a gating voltage, more familiarly known as a silicon controlled rectifier or transistor.

Figure 1:
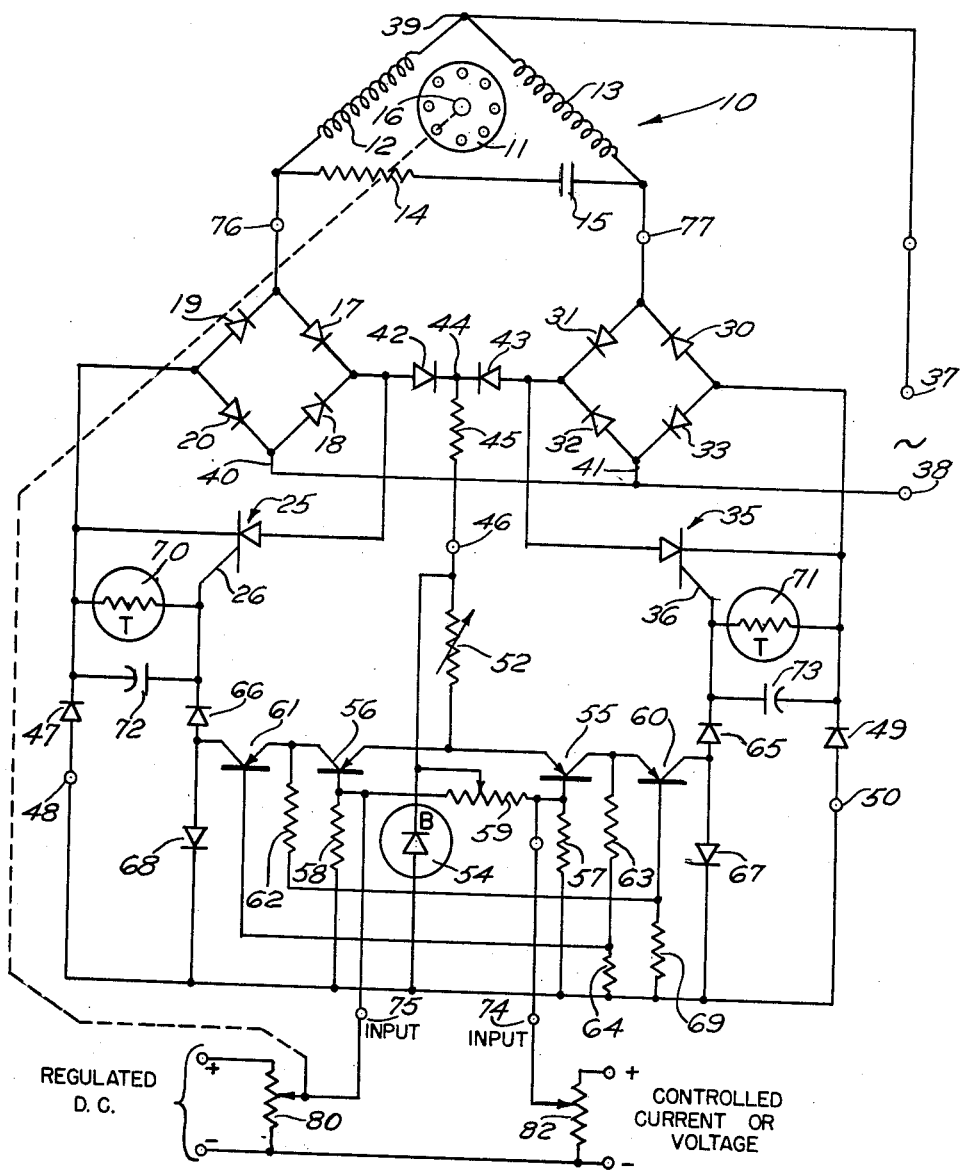
FIG. 1 is a schematic diagram of a preferred form of the invention.

In the embodiment of the invention illustrated in FIG. 1, a split phase motor 10 is shown as having a rotor 11, a pair of stator windings 12 and 13 for clockwise and counterclockwise rotation, together with a phase shifting network consisting of resistor 14 and capacitor 15. As is well known in the art, a motor such as this is started by two phase motor action through the use of the phase shifting network, the currents in the two stator windings being out of phase with each other, the out of phase relationship being produced by a difference in the resistance and reactance parameters of the two stator winding circuits. Rotative output from this motor may be obtained from the rotor shaft 16. Connected in series with the winding 12 is a bridge rectifier illustrated in the form of four diodes 17, 18, 19 and 20 which are arranged in back-to-back relationship, and connected across the output of the bridge rectifier is a switch 25 shown in the form of a silicon controlled rectifier having a gating input as at 26.

Connected in series with the winding 13 is a second bridge rectifier made up of four diodes 30, 31, 32 and 33 which are arranged in back-to-back relationship, and connected across the output of this bridge rectifier is a switch 35 shown in the form of a silicon controlled rectifier having a gating input as at 36.

A source of alternating current is supplied at terminals 37 and 38, the terminal 37 being connected to a common terminal between motor windings 12 and 13 as at 39, while the terminal 38 is connected to an input terminal of the bridge rectifiers as at 40 and 41. One output terminal of each of the bridge rectifier circuits is connected together through back to back rectifiers 42 and 43, the common junction point 44 being connected through a resistor 45 to a terminal 46. The other output terminal of each of the bridge rectifiers is also connected through a blocking rectifier as at 47 to a terminal 48 and as at 49 to a terminal as at 50.

Terminal 46 taken together with terminals 48 and 50, the latter of which are connected together, effectively form the source of power for a preamplifier circuit that is basically a direct current coupled balanced differential amplifier. The amplifier secures its operating voltage from terminal 46, terminal 46 having connected between it and a common point or terminals 48 and 50, a zener diode 54. The input stage of the preamplifier consists of a pair of transistors 55 and 56 whose bases are connected through resistances 57 and 58 to the common return of the circuit. The bases are also connected together by a resistance 59 which also serves as a balance potentiometer, and the emitters of transistors 55 and 56 are connected together and through the resistance 52 to the source of current at 46.

A second stage of the preamplifier consists of transistors 60 and 61 whose emitters are connected to the collectors of transistors 55 and 56. The bases of transistors 60 and 61 are connected through suitable biasing resistances 62, 63, 64 and 69 to the collector circuits of transistors 56 and 55 respectively, and in this fashion the entire preamplifier circuit with this cross coupling is made very sensitive to unbalance. The output, of course, of the preamplifier is had at the collectors of transistors 60 and 61 which then feed through forwardly biased diodes 65 and 66, respectively, the gates of silicon control rectifiers 35 and 25, respectively. Additionally, the collectors of transistors 60 and 61 are provided with another forwardly biased diode 67 and 68, respectively, which return to the negative terminal of the zener diode 54. This particular forwardly biased diode prevents the collector current from being blocked when the silicon controlled rectifier associated with that particular transistor is on. This is necessary since, when the silicon controlled rectifier is on, its gate voltage is high enough to reverse bias the diode between the gate and the associated transistor collector, thus tending to cause an untimely turning on of the opposite silicon controlled rectifier through feed-back reaction within the preamplifier itself.

Thermistors 70 and 71 are connected across the gate and cathode of the silicon control rectifiers. These thermistors are physically tied to the case of the silicon controlled rectifiers and thus compensate for the effects of ambient as well as internal temperature changes of the silicon controlled rectifier. Additionally, capacitors 72 and 73, respectively, are connected across the gate and cathode of each silicon controlled rectifier to compensate for any voltage transients and input noise that might otherwise cause an untimely turning on of the silicon controlled rectifiers.

An input, of course, to the preamplifier is had at the terminals labeled "Input" and, if for example the voltage at terminal 74 goes sufficiently negative, then the transistors 55 and 60 will cause a sufficient current flow in loop circuits to turn on the silicon controlled rectifier 35. When the silicon controlled rectifier 35 is turned on, this places a very small impedance across the bridge rectifier. It will be noted, of course, that as is well understood, an A.C. voltage is present across terminals 76 and 77 whenever the motor is running. When terminal 77 is positive, current flows through 31, 43, 45, the preamplifier, 47 and 19 to terminal 76. The reverse polarity has a flow path 17, 42, 45, the preamplifier, 49 and 30 to terminal 77. The zener diode is set so that it will clip the voltage at a level sufficient to operate the preamplifier, and as is the case with most solid state devices, a very small voltage is necessary. In one example which has been tried by the applicant, a zener diode with a clipping voltage of 5.6 volts has been found to be satisfactory.

Voltage will be supplied to the preamplifier regardless of whether the motor is running or not. With the motor running as just assumed in the description above, we find that a clipped, full-wave rectified and unfiltered A.C. voltage will be supplied which will be lagging the line vlotage by 45°. Assuming, however, that both of the silicon controlled rectifiers are turned off and the motor, of course, will not be running, we find that across the zener diode we have a clipped, full-wave rectified unfiltered A.C. voltage which is in phase with the line voltage. This voltage is obtained effectively across the terminals 37 and 38, and if one assumes that the A.C. voltage is positive at any instant at point 39, current can then be fed through both of the windings down the legs 17 and 31 of the bridge rectifiers, thence through the diodes 42 and 43 and to the resistance 45, the preamplifier, diodes 47 and 49, and diodes 20 and 33 to terminal 38. When voltage is positive at terminal 38, then current will flow through diodes 18 and 42 and also through diodes 32 and 43, thence through resistance 45, the preamplifier, diodes 47 and 49, diodes 19 and 30, motor windings 12 and 13 to terminal 37. In this fashion, there is no need to provide separate power supply circuitry for the amplifier function of the control circuit.

There are a number of ways in which unbalance of the two inputs 74, 75 may be obtained. For example, a regulated D.C. source may feed a potentiometer 80 whose wiper arm is mechanically coupled to the shaft of the motor and electrically connected to terminal 75. The signal input is then applied across potentiometer 82 whose wiper arm is electrically connected to terminal 74 and whose mechanical position is adjusted so that in the center null position the voltage across terminals 74, 75 is zero. The input signal across potentiometer 82 may be either current controlled or voltage controlled. Alternately, a Wheatstone bridge with D.C. excitation may be used.

Figure 2:
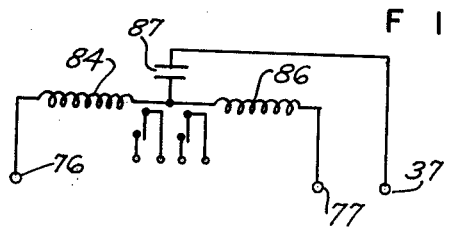
FIGS. 2 and 3 are modified loads for use with the circuit of FIG. 1.
Figure 3:
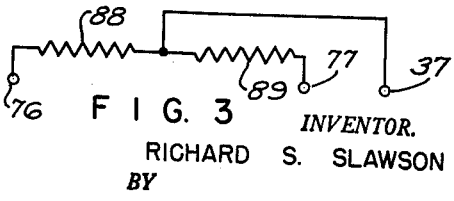

Referring to FIGURES 2 and 3, there is shown two basic load circuits that may be controlled alternately as were the windings of motor 10. To this end, in FIG. 2 relay windings 84 and 86 are connected together and to a capacitor 87, the other ends terminating at terminals 76 and 77. More simply the loads can be represented as resistance 88, 89 as in FIG. 3 since the capacitor 87 merely acts as a reactive device in combination with inductive devices 84, 86 to make the resultant impedance resistive in nature in order to obtain more sensitive operation of the relays.

Thus, there has been described a load control of general application which in its complete form has a self-contained preamplifier control that is powered directly from the A.C. supply without conventional dropping transformers or resistors and separate rectification.

I claim:

1. An A.C. control system for first and second loads, a first and second bridge rectifier, a source of alternating current having one terminal connected to each load and the other terminal connected to an input terminal of each bridge rectifier, the other input terminal of the first and second bridge rectifiers directly connected to the other terminal of the first and second loads respectively, switch means connected across the output respectively of the first and second bridge rectifiers, a forwardly biased diode connected from an output terminal of each bridge rectifier to a zener diode device and an impedance in series therewith, the other terminal of the zener diode connected to a second pair of forwardly biased diodes coupled to the other output terminal of each bridge rectifier and a connection across the zener diode device whereby a clipped and full-wave rectified A.C. voltage may be obtained whenever neither or one of said switch means is conducting, said voltage energizing the switch means.

2. A control system for a reversible motor having first and second windings, a first and second bridge rectifier, a source of alternating current having one terminal connected to each winding and the other terminal connected to an input terminal of each bridge rectifier, the other input terminal of the first and second bridge rectifiers directly connected to the other terminal of the first and second motor windings respectively, first and second silicon controlled rectifiers connected across the output respectively of the first and second bridge rectifiers, a voltage dropping resistor, a zener diode and blocking rectifiers connected across the outputs of said bridge rectifiers, a balanced differential amplifier having its outputs coupled to the gates of the silicon controlled rectifiers, the supply voltage for said amplifier taken across said zener diode.

3. A control system as in claim 2 wherein a blocking diode is in series with the gate coupling circuit of each silicon controlled rectifier.

4. A control circuit for a reversible motor having first and second windings, a first and second bridge rectifier, a source of alternating current having one terminal connected to each winding and the other terminal connected to an input terminal of each bridge rectifier, the other input terminal of the first and second bridge rectifiers directly connected to the other terminal of the first and second motor windings respectively, first and second silicon controlled rectifiers connected across the output respectively of the first and second bridge rectifiers, means for applying a control voltage in the gate cathode circuit of each silicon controlled rectifier through a forwardly biased diode to reduce the anode cathode resistance of one of the silicon controlled rectifiers and cause conduction through the associated bridge rectifier.

References Cited by the Examiner
UNITED STATES PATENTS 3,075,136  1/63  Jones ------------------ 307—88.5
3,109,971  11/63  Welch et al. ------------ 318—30

ORIS L. RADER, *Primary Examiner.*